(12) United States Patent
Bhide

(10) Patent No.: US 8,147,980 B2
(45) Date of Patent: Apr. 3, 2012

(54) WEAR-RESISTANT METAL MATRIX CERAMIC COMPOSITE PARTS AND METHODS OF MANUFACTURING THEREOF

(75) Inventor: Sudhir Vaman Bhide, Ahmedabad (IN)

(73) Assignee: AIA Engineering, Ltd., Ahmedabad (IN)

( * ) Notice: Subject to any disclaimer, the term of this patent is extended or adjusted under 35 U.S.C. 154(b) by 1350 days.

(21) Appl. No.: 11/688,762

(22) Filed: Mar. 20, 2007

(65) Prior Publication Data

US 2008/0102300 A1     May 1, 2008

(30) Foreign Application Priority Data

Nov. 1, 2006   (IN) .......................... 1821/MUM/2006

(51) Int. Cl.
 *B32B 5/16* (2006.01)
 *B32B 7/02* (2006.01)
 *B32B 15/16* (2006.01)

(52) U.S. Cl. ............ 428/545; 428/457; 501/87; 501/93; 501/153

(58) Field of Classification Search .................. None
See application file for complete search history.

(56) References Cited

U.S. PATENT DOCUMENTS

| | | | |
|---|---|---|---|
| 3,181,939 A | | 5/1965 | Marshall et al. |
| 4,586,663 A | | 5/1986 | Bartley |
| 4,787,564 A | | 11/1988 | Tucker |
| 4,792,353 A | * | 12/1988 | Kramer et al. .................. 75/235 |
| 4,940,188 A | | 7/1990 | Rodriguez et al. |
| 4,995,444 A | * | 2/1991 | Jolly et al. ....................... 164/97 |
| 5,154,984 A | * | 10/1992 | Morita et al. .................. 428/614 |
| 5,184,784 A | | 2/1993 | Rose et al. |
| 5,352,533 A | * | 10/1994 | Dreyer et al. .................. 428/472 |
| 5,435,234 A | | 7/1995 | Bentz et al. |
| 5,843,859 A | * | 12/1998 | Claussen ....................... 501/128 |
| 5,855,701 A | | 1/1999 | Bonnevie |
| 6,221,184 B1 | | 4/2001 | Bonnevie |
| 6,399,176 B1 | | 6/2002 | Francois |
| 6,887,585 B2 | * | 5/2005 | Herbst-Dederichs ......... 428/546 |

FOREIGN PATENT DOCUMENTS

| | | |
|---|---|---|
| DE | 702385 | 2/1941 |
| EP | 0838288 A1 | 4/1988 |
| EP | 97870099.5 | 11/1997 |
| EP | 0841990 B1 | 8/1999 |
| EP | 0930948 B1 | 8/2000 |
| EP | 1530965 B1 | 8/2006 |

(Continued)

OTHER PUBLICATIONS

Jung et al., "Machining of hot pressed alumina-boron carbide composite cutting tool", Feb. 2005, International Jornal of Refractory Metals and Hard Materials 23 (2005) 171-173.*

(Continued)

*Primary Examiner* — Jennifer McNeil
*Assistant Examiner* — Jason Savage
(74) *Attorney, Agent, or Firm* — Leydig, Voit & Mayer, LLP

(57) ABSTRACT

The invention relates to a metal matrix ceramic composite (MMCC) wear-parts comprising a wearing portion formed by a ceramic cake and is impregnated by metal. The ceramic cake comprises ceramic grains and carbide grains. The invention also relates to a method for manufacturing the wear-parts. The invention further describes a grinding roll and a table liner for a vertical mill each comprising a metal matrix ceramic composite wear part(s) of the invention.

30 Claims, 6 Drawing Sheets

FOREIGN PATENT DOCUMENTS

| | | |
|---|---|---|
| JP | 60127067 | 6/1985 |
| JP | 62286661 | 12/1988 |
| JP | H1-113161 | 5/1989 |
| JP | H1-289558 | 11/1989 |
| JP | 5200526 | 10/1993 |
| JP | 06-087650 | 3/2004 |
| WO | WO 94/06585 A1 | 3/1994 |
| WO | WO 97/05951 A1 | 2/1997 |
| WO | WO 98/31467 | 7/1998 |
| WO | WO 98/45486 | 10/1998 |
| WO | WO 99/47264 | 9/1999 |

OTHER PUBLICATIONS

Medvedovski, "Wear-resistant engineering ceramics", Feb. 2001. Wear 249 (2001) 821-828.*

Wang et al, "Influence of tungsten carbide particles on resistance of alumina maxtrix ceramics to thermal shock" Oct. 2000, Journal of the European Ceramic Society 21 (2001) 1213-1217.*

Shorowordi et al., "Miscrostructure and interface characteristics of B4C, SiC and Al2O3 reinfoced Al matrix composites: a comparative study", May 2003, Journal of MAterials Processing Technology 142 (2003) 738-743.*

Abd-Elwahab, Osama et al., "Einfluβ von Bor auf die Oberflächenspannung von stahlschmelzen," Neue Hütte, 1975, 20. Jg. Heft 7, Juli, pp. 390-392

Abraham, Thomas et al., "The Prospects for advanced polymer-metal and ceramic-matirx composites," Journal of Metals, 1988, 3 pp.

Article entitled "Fused Zirconia-Aluminas," Abrasives, vol. A 1(1 pp).

Article entitled: "Processes" and "Materials," New Products International (2 pp).

Asanti, et al, "On the Interface Reactions of Chromite, Olivine and Quartz Sands with Molten Steel," AFS Cast metals Research Journal, 1968, vol. 4, pp. 9-15.

Asanti, Paavo "On the Interface Reactions of Chromite, Olivine and Quartz Sands with Molten Steel," AFS Cast Metals Research Journal, 1968, vol. 4, (7 pp).

Barrows, Jerry et al., "New Sprayable Ceramic Fiber with Special Binder Provides Economical System for Insulating Furnaces," Industrial Heating, 1985, pp. 20-22.

Daganl, Ron, "Ceramic Composites Emerging as Advanced Structural Materials," News Focus, 1988, (6 pp).

Davis, et al., "Cast-in-Place Hardfacing," American Foundrymen's Society, Transactions, 1981, vol. 89, pp. 385-402.

DeYoung, Garrett H, "Marching into the New Stone Age," High Technology, 1985, (3 pp).

Fishamn, Steven "Advances in Cast Metal Composites," Journal of Metals, 1988, 2 pp.

Gertsman, S.L. et al., "An Investigation of Metal Penetration in Steel Sand Cores," pp. 595-603.

Gotheride, J. "A look into the future: wider application of the sodium silicate-carbon dioxide process through a better understanding of the basic principles and the new technology," AFS Transactions, from the 83rd Annual Meeting; Birmingham, AL, 1979, (37 pp).

Gundlach, R.B. "High-Alloy White Irons,"0 ASM Handbook, 1988, vol. 15, 1988, pp. 678-685.

Hansen et al., "Application of cast-on Ferrochrome-based hard surfacings to polystyrene pattern castings," U.S. Dept. of Commerce National Technical Information Service, 1985, (27 pp).

Hasegawa, Masayoshi, et al., "Strengthening of Steel by the Method of Spraying Oxide Particles Into Molten Steel Stream," American Society of Metals and the Metallurgical Society of Aime, 1978, vol. 9B, 6 pp.

Höner, et al. "Untersuchung der Penetration von Stahlschmelzen aus G-X70 Cr 29 Und G-X15 CrNiSi25 20 In furanharzgebundene Formstoffe auf Chromitsanbasis Teil 2," GiessereiForschung, 1983, vol. 35, pp. 43-53.

Höner, et al. "Untersuchung der Penetration Von Stahlscmeizen aus G-X70 Cr29 und G-X15 CrNiSi25 20 In Furanharzgebundene Formstoffe auf Chromitsanbasis Teil 1," Giesserei Forschung, 1983, vol. 35 , pp. 15-24.

Irving, Robert et al., "2000 Advanced Ceramics Toughen up their act," Iron Age, 1985, 5 pp.

Kaye, S. "Space-related Composite-Material Experiments," J. Vac. Sci. Technol., 1974, vol. 11, No. 6, pp. 1114-1117.

Kenney, M. et al., "Semisolid metal casting and forging," Metals Handbook, 9th Edition, 1998, vol. 15, (13 pp).

Kimura, Yoshinobu et al., "Compatibility between carbon fibre and binary aluminium alloys," Journal of Materials Science, 1984, vol. 19, pp. 3107-3114.

Martins, G.P. et al., "Modeling of Infiltration Kinetics for Liquid Metal Processing of Composites," Metallurgical Transactions B, 1988, vol. 18B, (6 pp).

McHargue, C.J. "Ion Implantation in Metals and Ceramics," International Metals Reviews, 1986, vol. 31, No. 2. (26 pp).

Munitz, A et al., "The interface phase in A1-Mg/Al$_2$O$_3$ Composites," American Society for Metals and the Metallurgical Society of Aime, 1979, vol. 10A, (7 pp).

Nicholas, K.E.L. "The CO$_2$-Silicate Process in Foundries," British Cast Iron Research Assoc., 1972, pp. 31-36.

Nicholas, K.E.L., "AFS-Modern Casting New Technology Seminar on Sodium Silicate Binders," American Foundrymen's Society Tech Report: No. 7419, 1974, 21 pp.

Onillon, M et al. "Phenomenes Chimiques Interfaciaux Contribuant A L'Abreuvage en Fonderie de Fonte," Janvier, 1980, pp. 9-13.

Poyet, P. et al. "Realisation Par Moulage De Pieces Bimetalliques Pour Application A des problemes de corrosion ou D'abrasion," Hommes et Fonderie, 1987, pp. 9-15.

Publication entitled: "Chemically bonded cores & molds, an operator's manual for the use of chemically bonded, self setting sand mixtures," American Foundrymen's Society, Inc., 1987, (100 pp).

Publication entitled: "Composites a Matrice Metallique: Des Supermetaux," L'Usine Nouvelle, 1987 pp. 26-30.

Publication entitled: "Das Ende Der Eisenzeit," (13 pp).

Publication entitled: "High Temperature Properties, Breakdown and Knock-out," (13 pp).

Publication entitled: "Les Nouvelles Ceramiques," Athena N' 55, 1989, (9 pp).

Publication entitled: "Metal Penetration and Sand Adherence," Journal of the Associate, 1952, pp. 4-11.

Publication entitled: "Metal-Based Materials Strengthen Structures," Tom Shelley reports, Eureka Transfers Technology, 1990, No. 7. (3 pp).

Publication entitled: "Uni-Bond Silicates," (5 pp).

Rohatgi, P. "Cast Metal-Matrix Composites," Metals Handbook Casting, 9th ed., 1988, vol. 15, (15 pp).

Sorensen, Toft "Céramiques Renforcées Par de l'oxyde de Zirconium et résistantes A l'usure," (3 pp).

Spirakis, James "Ceramics II," Advanced Materials & Processes Inc., Metal Progress, (4 pp), Mar. 1987.

Svoboda, J.M. "Mechanisms of Metal Penetration in Foundry Molds," Ninety-Eight Annual Meeting of the American Foundrymen's Society, 1994, (9 pp).

Tassot, P. "Introduction sur les ceramiques Techniques Modernes Proprietes—stabilite 8 premiere partie," La Revue de Metallurgie-CIT, Janvier, 1988, (10 pp).

* cited by examiner

WEAR-RESISTANT METAL MATRIX CERAMIC COMPOSITE PARTS AND METHODS OF MANUFACTURING THEREOF

CROSS-REFERENCES TO RELATED APPLICATIONS

This application claims priority to Indian Patent Application No.: 1821/MUM/2006 filed on Nov. 1, 2006, which is incorporated herein by reference for all purposes.

FIELD OF THE INVENTION

The present invention relates generally to wear-resistant wear-parts, and more particularly to wear-resistant metal matrix ceramic composites (MMCCs) and methods of manufacturing the same.

BACKGROUND

Many industrial applications involve components (i.e., wear-parts) which are subjected to wear during the life time of the part. The use of parts that requires wear-resistance are quite common in cement, mining and thermal power generation industries. When a wear-part is worn down, the part must be replaced. Consequently, any device using the wear-part cannot be used as the part is being replaced; the replacement of a worn out wear-part leads to a loss in operative time of the device. Therefore, an improvement in the wear resistance of a wear-part component would lead to a decrease in percentage of time lost due to replacing such worn components and increase the effectiveness of the wear-part.

Historically, 12% Mn steel and Ni-hards were used for wear resistant wear-parts applications during first half of twentieth century. During the last 50 years, high chromium irons have been successfully used for wear resistant wear-parts applications and have largely replaced Ni-hard and 12% Mn steel based materials.

The search for further improved wear resistance in wear-parts has continued, and in the past last 15 years, ceramic cakes and in particular metal matrix ceramic composites (MMCC) have been used with varying degree of success for wear resistant wear-parts applications. FIG. 1 illustrates a ceramic cake of the prior art. The ceramic cake 1 comprises ceramic grains 2 and often a binder 3. The binder in FIG. 1 is schematically represented as a thin layer around some of the grains. FIG. 2 illustrates a ceramic cake of the prior art infiltrated with metal. To impregnate the ceramic cake, molten metal is introduced. The molten metal fills the spaces between the grains 2 to form a matrix for the ceramic grains to produce a "metal matrix ceramic composite" part (MMCC). The ceramic material in MMCC's are usually in the form of grains, with alumina being a typical choice as it is known to be a good abrasive material.

In this regard, U.S. Pat. No. 3,181,939 (issued May 4, 1965; assigned to Norton Company, Mass, USA) to Douglas W. Marshal describes the manufacture of fused alumina zirconia abrasives which combine good wear resistance characteristics of alumina and the toughness of zirconia. Thus, alumina/zirconia grains appear to be a suitable candidate for metal matrix ceramic composites. Ullmann's Encyclopedia of Industrial Chemistry, Fifth Complete revision, part A1, Volume A1, paragraph 2.2 describes useful alumina/zirconia grains.

The art of preparing wear resistant parts by casting with embedded hard material is described in a German patent (by Dr. Wahl) No. 7326661; issued Jul. 20, 1973.

Japanese Patent No. 62286661 to Mr. Tamura of KiH (issued, Dec. 12, 1987) describes a method of impregnating ceramic particles with molten metal to produce composite casting with good wear resistance.

European Patent No. EP 0575858B1 filed by Staub Fritz (issued Jun. 23, 1992, assignee Zuzel Inotech AG) describes production of metal matrix ceramic composite casting with porous ceramic members at the wearing face. The ceramic particles used are described as corundum, zirconium oxide or magnesium oxide.

U.S. Pat. No. 6,399,176 (issued Jun. 4, 2002) describes the production of composite wear components by casting in which ceramic cakes were introduced on the wear surface, the ceramic cakes consisting of homogeneous solid solution of 20-80% alumina and 80-20% zirconia.

Although there are many examples of composite wear-parts, there remains a need in the art for further improvements to the property of wear resistance to these wear-parts.

BRIEF SUMMARY

The present invention provides metal matrix ceramic composite wear parts. In one embodiment, a metal matrix ceramic composite wear part comprise a ceramic cake with improved wear resistance. The metal matrix ceramic composite wear parts of the present invention have improved economic and wear properties as compared to presently used composites (i.e. of the prior art).

In one aspect, the present invention relates to a metal matrix ceramic composite wear part (MMCC) comprising a wearing portion formed by a ceramic cake impregnated by metal, wherein the ceramic cake includes at least one ceramic grain comprising alumina; and wherein the ceramic cake further includes grains comprising a carbide material selected from the group consisting of boron carbide, silicon carbide and tungsten carbide.

In another aspect, a method is provided for manufacturing a ceramic cake. The method typically includes combining a mixture of ceramic grains, fine ceramic powder, and optionally a binder in a flexible holder; and hardening the mixture to form the ceramic cake.

Additional aspects further include a grinding roll and a table liner for a vertical mill, each comprising a metal matrix ceramic composite wear-part of the present invention.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 3 is the addition of boron, silicon or tungsten carbide grains 5 as well as very fine ceramic powder 6.

Figure 4:
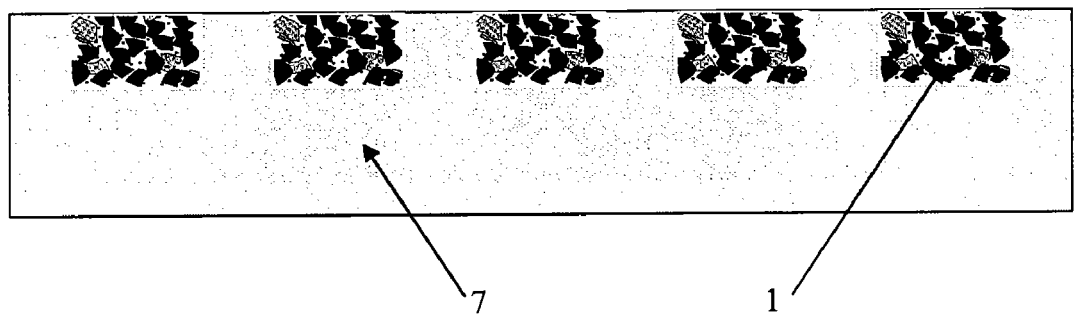

FIG. 4 illustrates a rubber core box 7 comprising a ceramic cake mixture 1 according to one embodiment of the invention 1.

Figure 5:
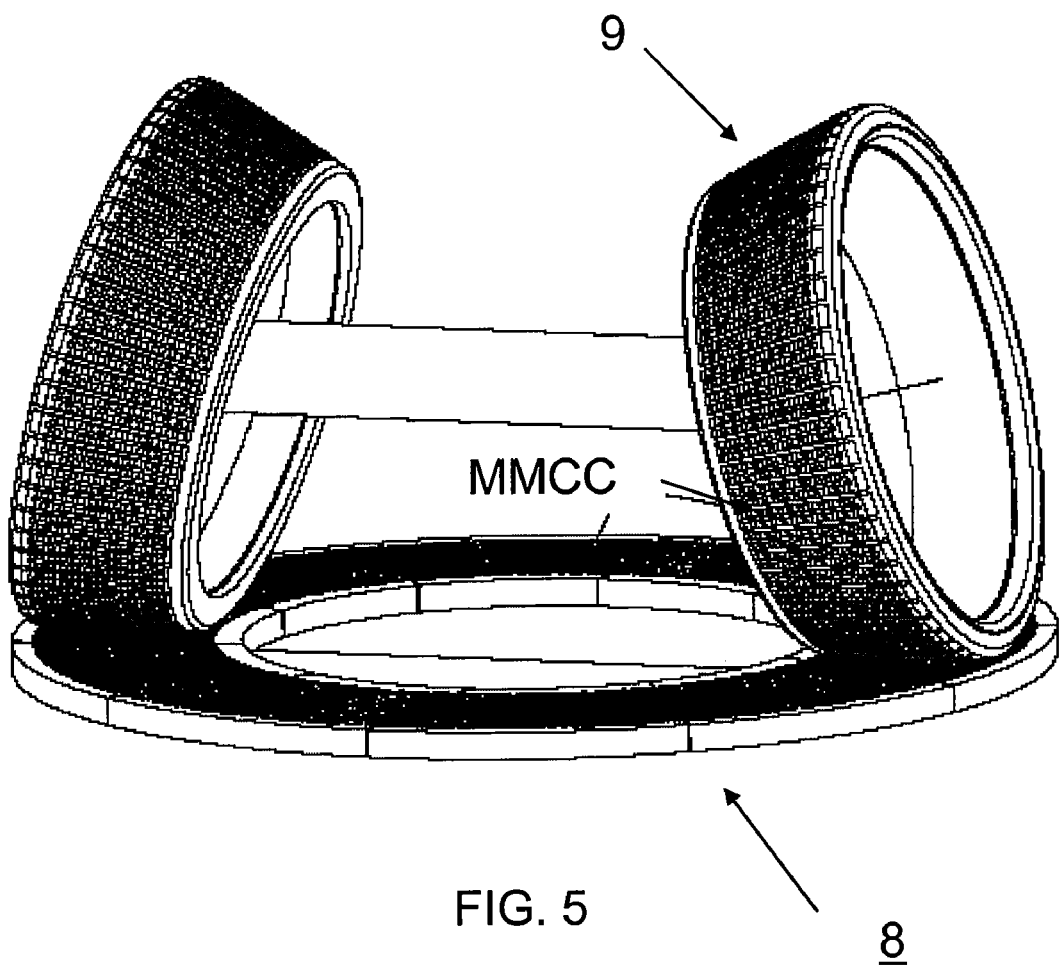

FIG. 5 illustrates a grinding roll mill having grinding rolls 9 that comprise a metal matrix ceramic composite wear-part of the invention.

Figure 6:
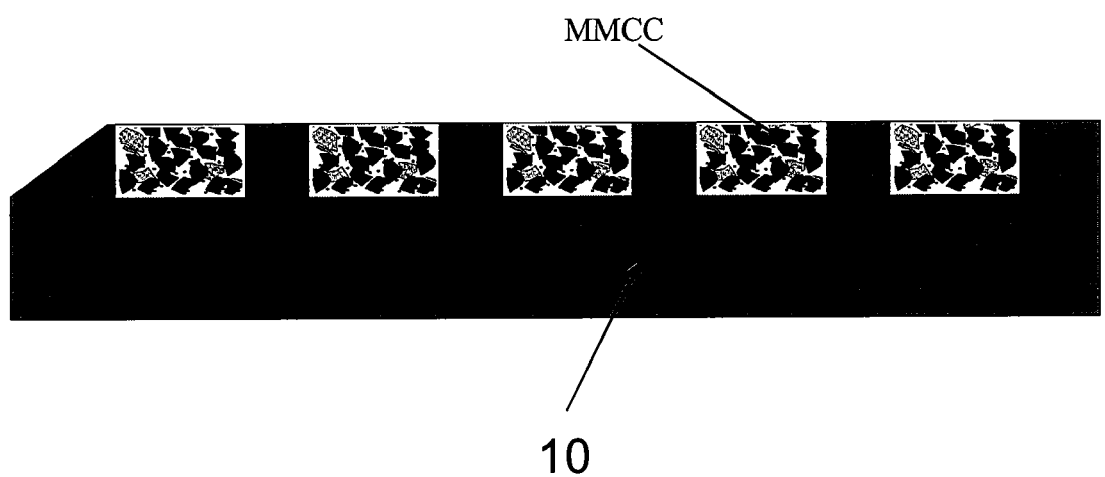

FIG. 6 illustrates a table liner 10 comprising a metal matrix ceramic composition wear-part (MMCC) of the invention.

Figure 7:
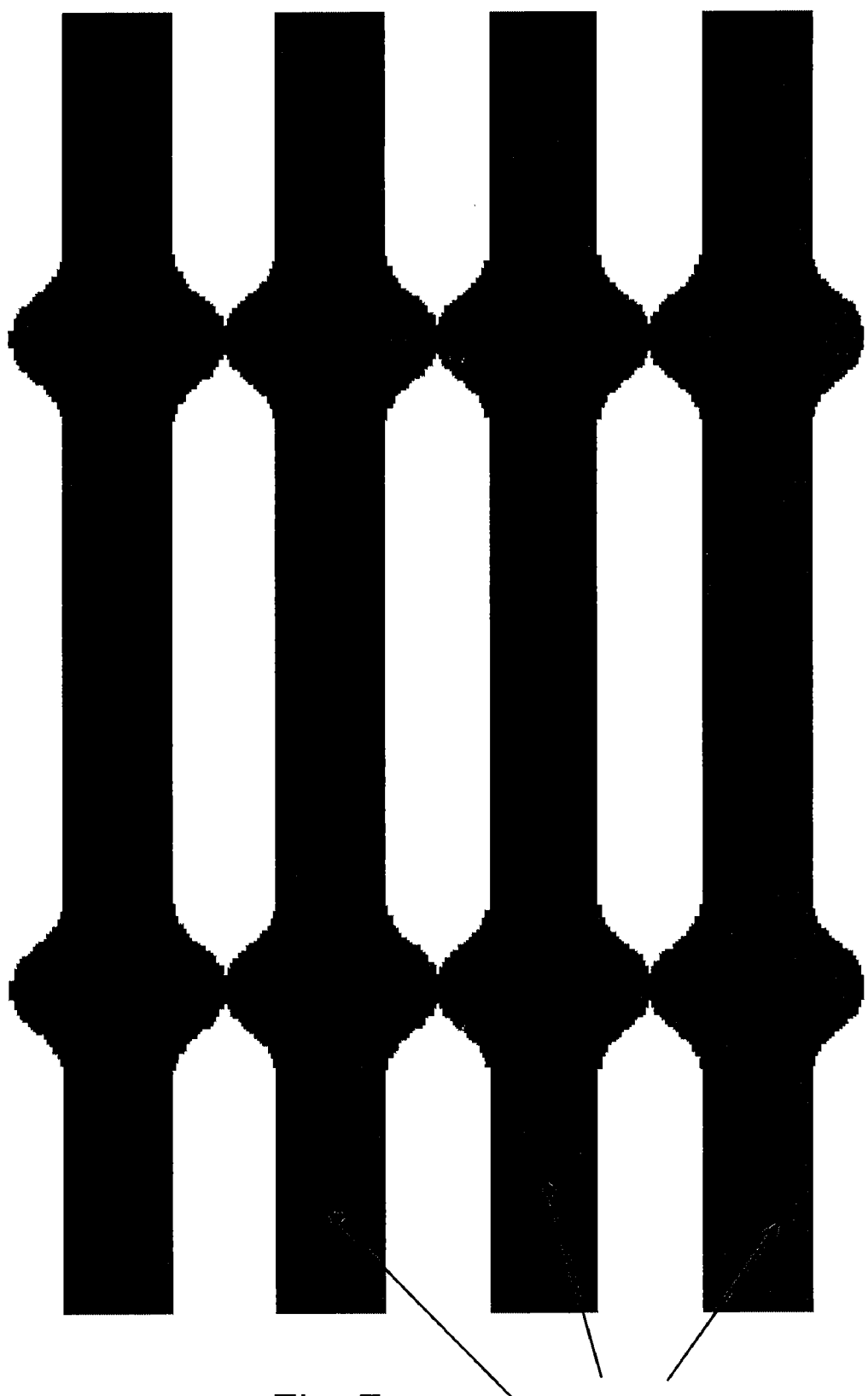
Figure 8:
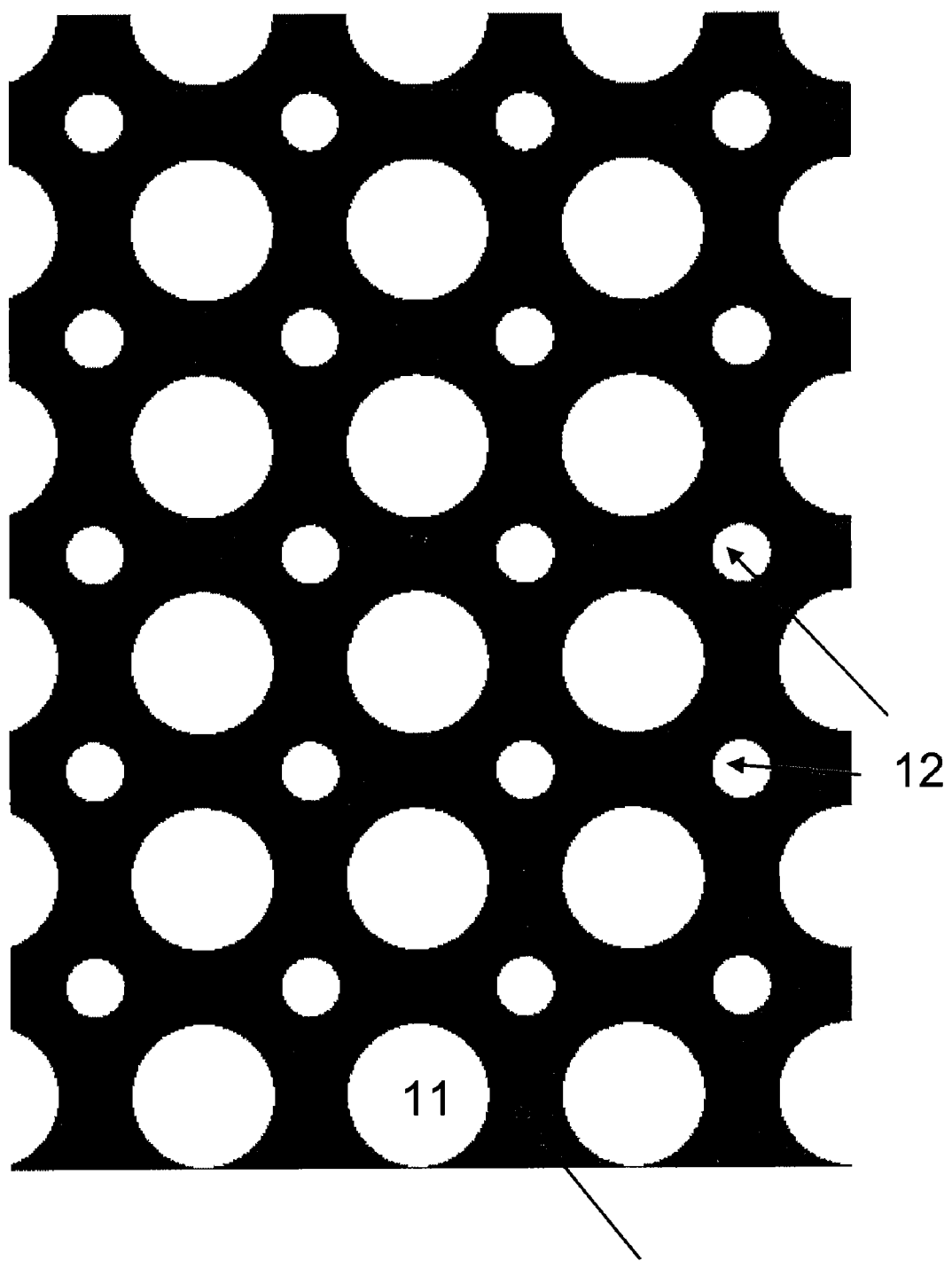

FIGS. 7 and 8 illustrates a ceramic cakes 1 arrangement. In FIG. 8, the ceramic cakes have large holes 11 and small holes 12.

DETAILED DESCRIPTION

In one embodiment, a metal matrix ceramic composite (MMCC) wear-part includes a wearing portion formed by a ceramic cake impregnated by metal. The ceramic cake includes at least one ceramic grain comprising at least alumina; and the ceramic cake further includes grains comprising a carbide material selected from the group consisting of boron carbide, silicon carbide and tungsten carbide. In one embodiment, the present invention provides for ceramic cakes that show improved wear resistance.

Figure 1:
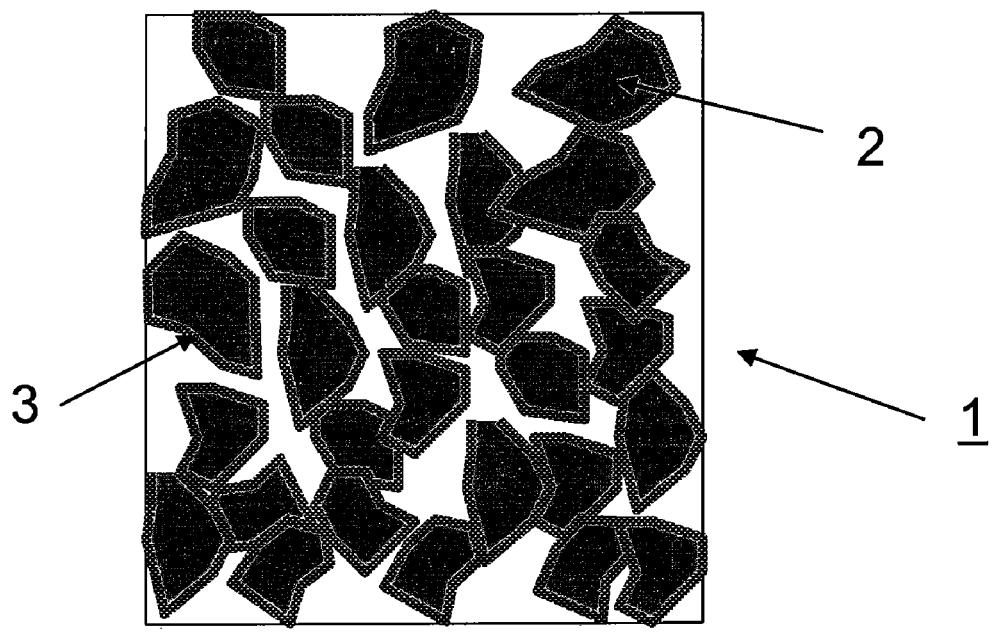
FIG. 1 illustrates a ceramic cake of the prior art. The ceramic cake 1 comprises ceramic grains 2 and often a binder 3. The binder in FIG. 1 is schematically represented as a thin layer around some of the grains.
Figure 2:
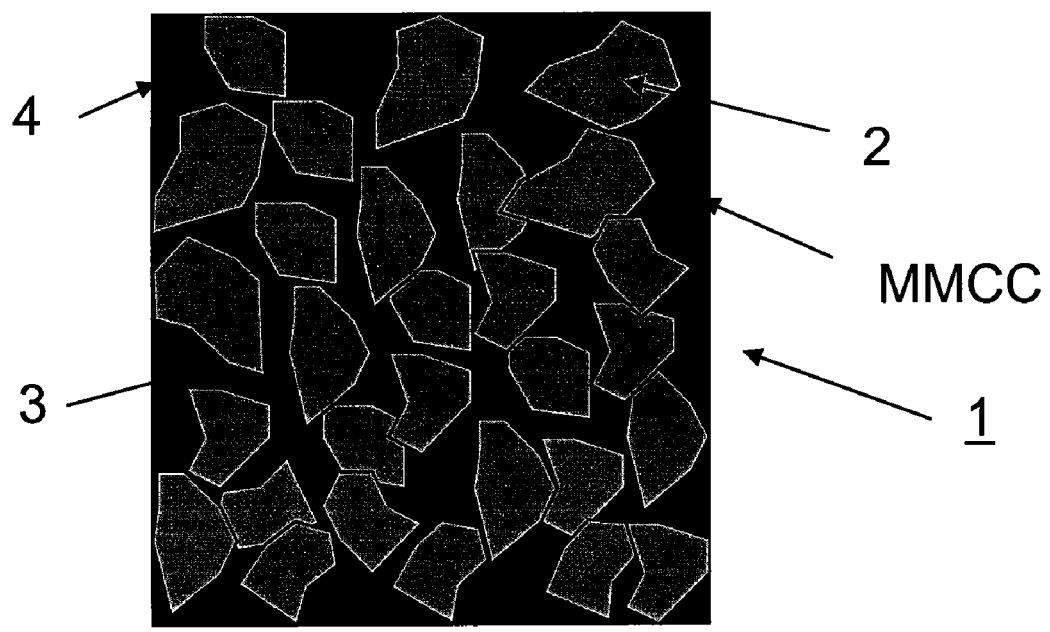
FIG. 2 illustrates a ceramic cake infiltrated with metal of the prior art. To impregnate the ceramic cake molten metal is introduced. The molten metal fills the spaces between the grains 2 to form a matrix for the ceramic grains to produce a "metal matrix ceramic composite" part (MMCC).
Figure 3:
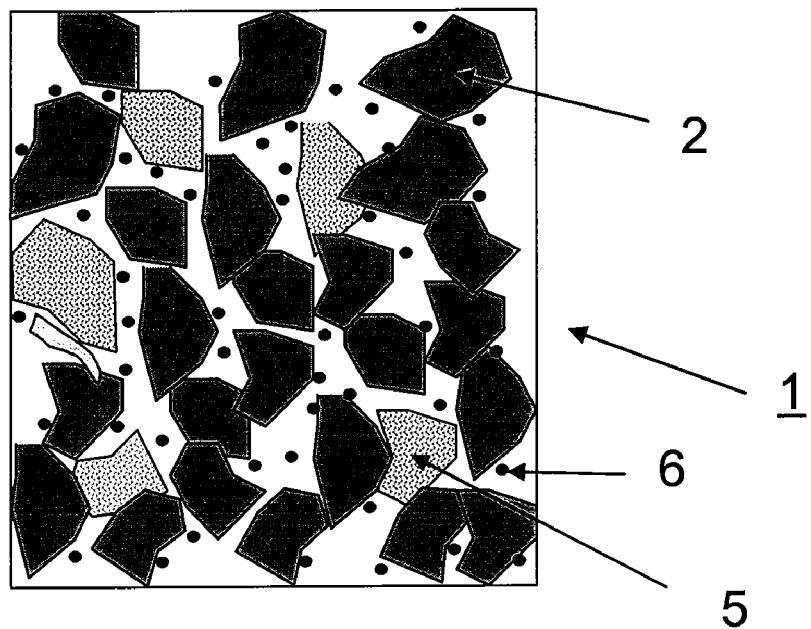
FIG. 3 illustrates a ceramic cake for a metal matrix ceramic composite wear-part according to one embodiment of the present invention. One difference between FIG. 1

FIG. 3 illustrates a ceramic cake for a metal matrix ceramic composite wear-part according to one embodiment of the present invention. One difference between the prior art ceramic cake of FIG. 1 and that of FIG. 3 is the addition of boron, silicon or tungsten carbide grains 5 as well as very fine ceramic powder 6.

Surprisingly, the inventors have discovered that the wear characteristics of a metal matrix ceramic composite wear-part are improved by the addition of carbide grains to a ceramic cake comprising ceramic grains including at least alumina. The presence of a very small amount of carbide grains in the ceramic cake will noticeably improve the wear resistance of the wear-part, whereas the addition of large amounts of carbide grains tend not to provide any further advantages on increasing the property of wear resistance. In a ceramic cake, the amount of carbide grains is preferably between about 1 to about 25% in weight of boron carbide, more preferably between about 2 to about 10% in weight. The above recited preferred weight percentage range for boron carbide grains (i.e., of between about 2% to about 10% in weight) corresponds for an amount of silicon carbide grain in a range in weight between about 2.5% to about 12.5%, and for tungsten carbide grains in a range in weight between about 3.6% to about 40%. In one preferred embodiment, the carbide grains are mainly comprised of boron carbide; boron carbide is the hardest of the mentioned carbide materials and the lightest. In one embodiment, a ceramic cake comprises about 5% in weight of boron carbide. In another embodiment, the carbide material is silicon carbide, in which the silicon carbide is present in an amount of between about 1.2% to about 30% by weight; or alternatively between about 2.5% to about 12.5% by weight. In yet another embodiment, the carbide material is tungsten carbide, in which the tungsten carbide is present in an amount between about 5.6% to about 66% by weight; or alternatively between about 3.6% to about 40% by weight.

Due to the differences between the specific gravity of carbide grains and ceramic grains (e.g., ceramic grains comprising alumina/zirconia), the weight percent of a carbide material in the ceramic cake will differ from its volume percentage. For example, a ceramic cake that comprises 5% in weight of boron carbide will occupy approximately 7.5% by volume of the ceramic cake. Analogously, a ceramic cake comprising 20% in weight of boron carbide will be present in the cake in an approximately 27.5% by volume. Given the difference in specific gravity between boron carbide (approximately 2.5 gr/cc) and alumina/zirconia (approximately 3.8 gr/cc) this means that a percentage in weight between about 1% to about 25% corresponds to a percentage in volume of the carbide grains in the ceramic material between about 1.5% to about 34%. When the same size particles is used (i.e. the volume of each the alumina/zirconia and the boron carbide grain would be the same), this would mean that about 1 in about 60 to about 1 in about 3 of the total of alumina/zirconia comprising grains and carbide grains is a carbide grain.

The same volume percentage range (i.e., about 1.5% to about 34%) would correspond to an amount of silicon carbide grains (which have a higher specific gravity of 3.2 gr/cc) in a weight range between about 1.2% to about 30%; and an amount of tungsten carbide grains (which have a specific gravity of 15 gr/cc) in a weight range between about 5.6% to about 66%.

Additionally, in one embodiment, the ceramic grains present in the ceramic cake comprises zirconia and titanium oxide, in addition to alumina. In certain aspects of this embodiment, the alumina is present in an amount of between about 30% to about 65%; zirconia is present for an amount between about 30% to about 65% and titanium oxide is present in an amount of about 1% to about 7%, wherein the above recited percentages are expressed in terms of weight percent over all of the grains. In one embodiment, titanium oxide is present in the ceramic cake in an amount between about 2% to about 6% by weight. In another embodiment, the titanium oxide is present in the ceramic cake in an amount between about 3% to about 5.5% by weight. In another embodiment, alumina is present in the ceramic cake in an amount between about 40% to about 55% by weight. In another embodiment, the zirconia is present in the ceramic cake in an amount between about 40% to about 50% by weight.

Additionally, in certain other embodiments, the percentages of alumina and zirconia in the ceramic grains are between about 40% and about 55% by weight for alumina and about 40 to about 50% by weight for zirconia. In one embodiment, the alumina and zirconia contents in the alumina/zirconia/titanium oxide grains are each approximately 50% and the titanium oxide content is approximately 5%.

The inclusion of zirconia in ceramic grains comprising alumina has a positive effect on the wear resistance of the grains. Further inclusion of titanium oxide into the ceramic grains has an additional positive effect on the wear resistance. Interestingly, titanium oxide is itself considerably softer than either alumina or zirconia, which makes its positive effect on wear resistance all the more remarkable. In a preferred embodiment, the amount of titanium oxide is between about 2% to about 6%, most preferably between about 3% and about 5.5% by weight of the grains.

It is noted that the amount of alumina/zirconia/titanium oxide present in each individual grain within the metal matrix ceramic composite wear-part, and that all percentages mentioned above, relate to average percentages over all the individual grains combined. For example, on a microscopic level, each ceramic grain comprising alumina and zirconia is typically composed of a phase mixture of different solid phases, i.e., the grains are not a homogeneous solid solution. For example, inside an individual ceramic grain comprising alumina and zirconia, the composition is not homogeneous but a phase mixture is present, i.e. different parts of the grain have a different composition, some parts forming a solid phase comprising a first percentage of alumina and a second percentage zirconia, other parts forming a different solid phase or solid phases having different percentages alumina and zirconia or being mainly composed of alumina or zirconia. These solid phases can optionally comprise titania. Thus ceramic grain, as a whole, is in the form of a phase mixture.

The sizes of ceramic and carbide grains are normally described in grit sizes in accordance to FEPA standards. The grit sizes recommended to be used for producing metal matrix ceramic composite ranges from about 6 to about 12 grit sizes as per FEPA standard. In a preferred embodiment, the alumina/zirconia and carbide grains are of comparable grit size, i.e. not differing by more than 4 grit sizes, preferably not more than two grit sizes. In one embodiment, the alumina/zirconia and carbide grains are of the substantially the same grit size.

In other embodiments, a ceramic cake comprising ceramic and carbide grains can further comprise additional constituents which can act to improve the bonding and mouldability of the grains (which are relatively coarse). One such constituent is sodium silicate which helps bind the grains and improves mouldability.

In the manufacture of a ceramic cake of the invention, it may be desirable, for example, to produce a ceramic cake having ceramic and carbide grains at specific locations. Additionally, it also may be desirable to shape the ceramic cakes of the invention comprising ceramic and carbide grains as to possess adequate strength to withstand engulfing by a liquid metal. To achieve this, the ceramic cake can optionally comprise a very fine ceramic powder, to further improve the mouldability and the hardness of the ceramic cake and increase the wear resistance of the final product. In one embodiment, the very fine ceramic powder is mainly comprised of aluminium oxide powder. As stated above, the presence of fine ceramic powder, e.g., of alumina, further improves the mouldability of the of the ceramic cake mixes and wear resistance. In a preferred embodiment, the ceramic cakes of the invention comprises a fine ceramic powder, preferably alumina.

As used herein, the term "very fine powder" refers to a powder of a size considerably smaller (e.g., at least about one, and preferably about two orders of magnitude) than the size of the ceramic grains (comprising, for example, alumina/zirconia/titania). In a preferred embodiment, the ceramic cakes further comprise approximately 3% by weight of a fine alumina powder and approximately 5% of the weight of an inorganic binder. In another embodiment, the binder is sodium silicate and is present in an amount between about 4% to about 6%. Such fine ceramic powder is preferably mixed in a weight percentage of between about 1% and about 4%, i.e. relative to the total weight of the ceramic grains and carbide grains. In one embodiment, the grain size of a fine ceramic powder is in the range of FEPA grit sizes of between about 1000 to about 1400. By contrast, the grain size of the ceramic grains and the carbide grains are preferably in the range of about 6 to about 12 FEPA grit sizes.

In one embodiment, the ceramic cakes further comprise approximately 3% by weight of a fine alumina powder and approximately 5% of the weight of a sodium silicate inorganic binder.

The addition of very fine ceramic powder, preferably comprising aluminium oxide powder, along with sodium silicate to a ceramic cake mix has shown to provide improved mouldability and achieve an increase in strength. The addition of a 1000 to 1400, preferably 1200 grit fine aluminium oxide powder imparts thixotropic properties to the ceramic cake. In one preferred embodiment, fine alumina powder is used as the fine ceramic powder, but other fine ceramic powders, for instance zirconia or alumina/zirconia powders could also be used. FIG. 3 illustrates schematically the presence of a fine alumina powder 6 in a ceramic cake according to one embodiment.

In another aspect, the present invention provides for a method for the manufacturing of a ceramic cake comprising the steps of: combining a mixture of ceramic grains, carbide grains, fine ceramic powder and a binder in a flexible holder, and hardening the mixture to form a ceramic cake. The above-described mixture of ingredients in a ceramic cake (e.g., grains, very fine ceramic powders and binders typically do not have adequate "green strength" (i.e., adequate strength in the unbaked state)). In these instances, the shaped ceramic cakes are preferably supported in a flexible core box, preferably a rubber core boxes (e.g. silicone rubber). In one embodiment, the core boxes used in the manufacturing of ceramic cakes are composed of rubber. The use of a flexible, preferably rubber core box (e.g., silicone) facilitates the manufacturing of cakes of complex shapes. FIG. 4 illustrates the use of a rubber core box 7 around ceramic cakes 1 according to one embodiment. The rubber core boxes having the desired shapes are filled with the above-described ceramic cake mixture and gassed with carbon dioxide to develop adequate strength for handling. After gassing, the filled rubber core boxes are then heated to temperature between about 80° C. to about 220° C. for about one to about four hours so that adequate strength is developed.

In one embodiment, a ceramic cake mixture comprising ceramic grains, fine ceramic (alumina) powder and sodium silicate are filled in a flexible, rubber core boxes of a suitable shape. These core boxes comprising the ceramic cakes are then gassed and baked to develop good strength.

After the gassing and baking process, the ceramic cakes are then positioned at the desired surfaces of moulds (e.g., refractory moulds). The mould assemblies are then closed and liquid metal is poured into the cavity. A suitable liquid metal composition is selected based on the intended application of the final wear-part. For example, high impact applications may require steel, while low impact applications may tolerate irons. Chromium steels may contain between about 0.2% to about 1.2% C and about 2% to about 8% Cr, and have additional alloying elements such as Mn, Mo, Ni & Cu. Mn steels may contain between about 0.8% to about 1.2% C and about 8% to about 14% Mn with other elements such as Si, Cr, S and P. The irons may contain between about 1% to about 3.5% C, and about 11% to about 28% Cr with addition of other alloying elements, such as Mo, Ni and Cu. Generally for wear resistance applications, the above mentioned types of steels and irons are commonly used. However, other non-ferrous alloys can be used also.

Upon cooling, the moulds are disturbed after adequate cooling time and the wear-parts thus produced are subjected to special heat treatment so that metallic portion develops better wear resistance, and liquid metal is poured into the mould cavity to produce metal matrix ceramic composite castings. Metal matrix ceramic composites comprise ceramic parts embedded in a metal matrix.

EXAMPLES

Additional aspects of the invention are explained in further detail by way of the following examples with reference to the Figures as needed. The examples provided below illustrate but do not limit the present invention.

Example 1

The following example describe two ceramic cakes of the invention comprising 5 and 20% by weight of boron carbide grains.

The two ceramic cake having 5 and 20% by weight of boron carbide and is further comprised of 87% and 72%, respectively, of alumina/zirconia/titania grains, wherein alumina is present in the grains in the range of about 30 about 65%, zirconia is present in the range of about 30 to about 65% and titanium oxide is present in the range of about 1-7%. Typically in a preferred embodiment, the alumina and zirconia contents in the alumina/zirconia/titanium oxide grains are approximately 50% and the titanium oxide content is approximately 5%. In a preferred embodiment, the ceramic cakes further comprise approximately 3% by weight of a fine alumina powder and approximately 5% of the weight of an inorganic binder. The grain size of the boron carbide grains and the alumina/zirconia/titania grains in present in the two cake described in this example are the same and have, for example, a FEPA size of about 10.

The wear of ceramic metal composites having such ceramic cakes including boron carbide grains was compared to the wear of ceramic metal composites with the same constitution but lacking the boron carbide grains. More specifically, the presence of 5% boron carbide grains by weight in a ceramic metal composite proved to decrease the wear rate by approximately 15%; the presence of 20% boron carbide grains by weight provided no additional observable decrease in wear rate.

As explained above, these results are contrary to the prior art. Surprisingly, the addition of even a relatively small amount of carbide grains has a positive effect. The increase of wear resistance is not proportional to the amount of boron carbide grains added, which is an indication of the presence of a cooperative effect, wherein the inclusion of a minor amount of carbide (between about 2% and 10%) has a protective effect increasing the wear resistance.

The advantageous effect proved to be substantially higher in a region around 5% than for 20%. A preferred range is weight for boron carbide is between 2 and 10% weight.

Example 2

A wear part having a composition as each described in Example 1 which can find application in a grinding roll used by thermal power stations was produced using the process disclosed herein. This wear-part was produced using centrifugal casting process. The manufacturing sequence involved the production of cakes of mineral grains, the introduction of the cakes to produce composite castings called inserts, locating the inserts into centrifugal die, the pouring of SG iron in to the spinning die to develop composite casting. The casting thus produced was heat treated and evaluated for its wear resistance property. It was observed that the life of wear components improved substantially. FIG. 5 illustrates a vertical spindle mill having cast metal matrix ceramic composite parts (MMCC) on grinding table 8 and grinding rolls 9.

Example 3

Another wear-part having the composition as of each described in Example 1 can be used in an application as a table liner for a vertical mill was produced. Ceramic cakes of mineral grains were introduced at the wear surface of the part of the casting. The casting was produced using a conventional foundry casting process. FIG. 6 shows schematically a table liner 10 with metal matrix ceramic composite parts (MMCC) as inserts. The casting was heat treated and machined, and tested for wear characteristics. Significant improvement of up to 15% increase in wear resistance was observed by the addition of carbide grains for table liners for vertical mills.

Example 4

FIG. 3 illustrates one design for a ceramic cake of the invention. Within the framework of the invention, the ceramic cake may be formed in various shapes and the forms and ceramic cakes may be arranged in various patterns. FIGS. 7 and 8 illustrate such shapes and forms and patterns. FIG. 7 shows an arrangement of stripe-like ceramic cakes. FIG. 8 shows a ceramic cake which contains large holes 11 and small holes 12. These holes are provided on a rectangular grid.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A metal matrix ceramic composite wear part (MMCC) comprising a wearing portion formed by a ceramic cake impregnated by metal, wherein the ceramic cake comprises:
    at least one ceramic grain including alumina, and
    carbide grains including a carbide material selected from the group consisting of boron carbide, silicon carbide and tungsten carbide, wherein the ceramic cake comprises about 1 to about 4% by weight of a fine ceramic powder, expressed in weight of the ceramic grains.

2. The metal matrix ceramic composite wear part of claim 1, wherein said carbide material is boron carbide.

3. The metal matrix ceramic composite wear part of claim 2, wherein the boron carbide content in the ceramic cake is between about 1% to about 25% by weight.

4. The metal matrix ceramic composite wear part of claim 3, wherein the boron carbide content in the ceramic cake is between about 2% to about 10% by weight.

5. The metal matrix ceramic composite wear part of claim 1, wherein the carbide material is silicon carbide.

6. The metal matrix ceramic composite wear part of claim 5, wherein the silicon carbide content in the ceramic cake is between about 1.2% to about 30% by weight.

7. The metal matrix ceramic composite wear part of claim 5, wherein the silicon carbide content in the ceramic cake is between about 2.5% to about 12.5% by weight.

8. The metal matrix ceramic composite wear part of claim 1, wherein the carbide material is tungsten carbide.

9. The metal matrix ceramic composite wear part of claim 8, wherein the tungsten carbide content in the ceramic cake is between about 5.6% to about 66% by weight.

10. The metal matrix ceramic composite wear part of claim 8, wherein the tungsten carbide content in the ceramic cake is between about 3.6% to about 40% by weight.

11. The metal matrix ceramic composite wear part of claim 1, wherein said ceramic grains comprising alumina further comprise zirconia and an amount of titanium oxide.

12. The metal matrix ceramic composite wear part of claim 11, wherein the titanium oxide content is between about 2 to about 6% by weight.

13. The metal matrix ceramic composite wear part of claim 12, wherein the titanium oxide content is between about 3 to about 5.5% by weight.

14. The metal matrix ceramic composite wear part of claim 12 further comprising sodium silicate binder in the range of about 4 to about 6%.

15. The metal matrix ceramic composite wear part of claim 11, wherein the amount of zirconia is between about 40 to about 50% by weight.

16. The metal matrix ceramic composite wear part of claim 1, wherein the amount of alumina is between about 40 to about 55% by weight.

17. The metal matrix ceramic composite wear part of claim 1, wherein the ceramic grains are in the range of FEPA 6-12 grit sizes.

18. The metal matrix ceramic composite wear part of claim 17, wherein the carbide grains are in range of FEPA 6-12 grit sizes.

19. The metal matrix ceramic composite wear part of claim 1, wherein the fine ceramic powder has a grit size at least two orders of magnitude smaller that the grit size of the ceramic grains.

20. The metal matrix ceramic composite wear part of claim 1, wherein the fine ceramic powder comprises alumina powder.

21. The metal matrix ceramic composite wear part of claim 1, wherein the fine ceramic powder is in the range of FEPA 1000-1400 grit sizes.

22. The metal matrix ceramic composite wear part of claim 1, wherein the ceramic cake comprises sodium silicate as a binder.

23. The metal matrix ceramic composite wear part of claim 1, wherein the metal matrix ceramic composite wear part comprises a metal from the group consisting of: chromium steel containing between about 0.2% to about 1.2% C and about 2% to about 8% Cr optionally comprising elements selected from Mn, Mo, Ni and Cu, Mn Steel containing between about 0.8% to about 1.2% C and about 8% to about 14% Mn with optionally comprising elements selected from Si, Cr, S and P; and irons containing between about 1% to about 3.5% C, about 11% to about 28% Cr and optionally comprising alloying elements selected from Mo, Ni and Cu.

24. A grinding roll comprising a metal matrix ceramic composite wear part (MMCC) as claimed in claim 1.

25. A grinding roll mill comprising a grinding roll as claimed in claim 24.

26. A table liner for a vertical mill comprising a metal matrix ceramic composite wear part (MMCC) as claimed in claim 1.

27. A vertical mill comprising a table liner as claimed in claim 26.

28. A ceramic cake for a metal matrix ceramic composite wear part (MMCC), comprising:
   at least one ceramic grain including alumina, and
   carbide grains including a carbide material selected from the group consisting of boron carbide, silicon carbide and tungsten carbide, wherein the ceramic cake comprises about 1 to about 4% by weight of a fine ceramic powder, expressed in weight of the ceramic grains.

29. A metal matrix ceramic composite wear part comprising a wearing portion foamed by a ceramic cake impregnated by metal, wherein the ceramic cake comprises:
   at least one ceramic grain including alumina, and
   carbide grains including a carbide material selected from the group consisting of boron carbide, silicon carbide and tungsten carbide,
   wherein the ceramic cake further comprises fine ceramic powder, and wherein the fine ceramic powder has a grit size at least two orders of magnitude smaller that the grit size of the ceramic grains.

30. A metal matrix ceramic composite wear part comprising a wearing portion formed by a ceramic cake impregnated by metal, wherein the ceramic cake comprises:
   at least one ceramic grain including alumina, and
   carbide grains including a carbide material selected from the group consisting of boron carbide, silicon carbide and tungsten carbide,
   wherein the ceramic cake further comprises fine ceramic powder, and wherein the fine ceramic powder is in the range of FEPA 1000-1400 grit sizes.

* * * * *